United States Patent Office 2,823,212
Patented Feb. 11, 1958

2,823,212

DYESTUFFS OF THE ANTHRAQUINONE SERIES

Ernst Anton and Karl Saftien, Ludwigshafen (Rhine), Germany, assignors to Badische Anilin- & Soda-Fabrik Aktiengesellschaft, Ludwigshafen (Rhine), Germany No Drawing. Application March 23, 1956
Serial No. 573,344

Claims priority, application Germany March 24, 1955

6 Claims. (Cl. 260—376)

This invention relates to dyestuffs of the anthraquinone series, and more particularly to dyestuffs of esterified mono- and dicarboxylic acids of the anthraquinone series.

We have found that new and valuable dyestuffs of the anthraquinone series can be obtained which have the general formula

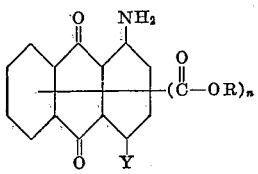

wherein Y is a member of the group consisting of amino, arylamino, and hydroxyl radicals, R is a member of the group consisting of alkyl and cycloalkyl radicals containing not more than 8 carbon atoms, and $n$ is an integer of 1 to 2. The carboxylic acid ester group is shown in the formula as being substituted in at least one and not more than two of the positions 2, 3, 5, 6, 7 and 8.

The new dyestuffs can be obtained by esterifying mono- or dicarboxylic acids of the anthraquinone series in which the anthraquinone molecule is substituted in the 1 and 4 positions by an amino group, by an amino group and a hydroxyl group, or by other substituents capable of being converted into an amino or hydroxyl group by conventional methods either before or after esterification.

Suitable mono- and di-carboxylic acids of the anthraquinone series are for example 1.4-diaminoanthraquinone-2.3-dicarboxylic acid, 1-amino- or 1-methylamino-4-nitro-anthraquinone-2-carboxylic acid, 1-amino-4-bromoanthraquinone-2-carboxylic acid, 1.4-dibromoanthraquinone-2-carboxylic acid, 1.4-dichloroanthraquinone-6-carboxylic acid, 1.4-dichloroanthraquinone-5-carboxylic acid or 1-amino-4-hydroxyanthraquinone-2-carboxylic acid.

Suitable esterification components are for example methyl alcohol, ethyl alcohol, isopropyl alcohol, isobutyl alcohol, hexyl alcohol, octyl alcohol, cyclohexanol, dimethyl cyclohexanol, benzyl alcohol or phenyl ethyl alcohol.

For the esterification it is preferable to heat the chlorides of the said carboxylic acids with a large excess of the monohydroxyl compounds at about 60° to 110° C. Usually the esters separate in well-crystallized form upon cooling. The carboxylic acids can however also be converted directly into their esters by heating with sulfuric acid esters of the alcohols, as for example with methyl or ethyl sulfuric acid.

When the resulting esters contain a nitro group in the 1- and/or 4-position of the anthraquinone nucleus, this is then reduced to the amino group by conventional methods, as for example with stannous chloride and hydrochloric acid or with alkali hyposulfite. If halogen atoms are present in the alpha-positions of the anthraquinone nucleus, these are also reacted by conventional methods with arylamines, such as aniline, or with sulfonamides, such as toluene sulfonamide, the sulfonyl group then being split off by hydrolysis.

The new compounds are in general formed in very good yields and excellent purity. They are hardly soluble in water but dissolve in most organic solvents with clear blue-red to blue colors. They may therefore serve with advantage for coloring these solvents, as for example hydrocarbons.

In particular, however, they are distinguished by an excellent dyeing value for fibres of polyester fibres as for example polyterephthalic acid glycol ester on which they yield clear violet to blue dyeings of very good fastness. They are also suitable for dyeing fibres of polyamides and polyurethanes as well as of cellulose esters or ethers, on which they have a remarkable fastness to waste gas.

The dyeing of the fibres, threads, yarns, fabrics or webs can be effected for example by treating them in an aqueous dyebath containing the dyestuffs in finely divided form, at elevated temperature, preferably at the boiling temperature of water. The dyebath may also have added thereto soaps or other dispersing or wetting agents.

The following examples will further illustrate this invention but the invention is not restricted to these examples. The parts are parts by weight.

*Example 1*

10 parts of 1-amino-4-nitroanthraquinone-2-carboxylic acid chloride and 100 parts of cyclohexanol are heated at 110° to 120° C. until the evolution of hydrochloric acid is completed. Upon cooling, 1-amino-4-nitroanthraquinone-2-carboxylic acid cyclohexyl ester crystallizes out. It is filtered off by suction, washed with cyclohexanol and alcohol and dried.

5.9 parts of this ester are suspended in 30 parts of alcohol and there is added thereto a solution of 14 parts of stannous chloride in 14 parts of concentrated hydrochloric acid. The temperature thereby rises to about 60° C. It is then boiled for a short time, cooled, filtered by suction and the dark red crystals suspended in 150 parts of water at 60° to 70° C. and a powerful current of air led through the liquid. In this way a change of color to blue takes place. The precipitate is filtered off by suction, washed thoroughly with water, dried and recrystallized from dioxane. The dyestuff has the formula:

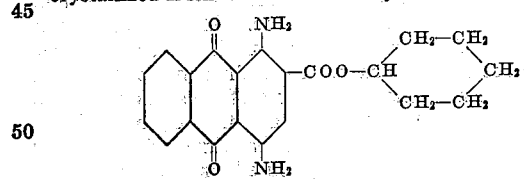

and colors hydrocarbons clear blue shades.

*Example 2*

0.4 part of 1.4-diaminoanthraquinone-2-carboxylic acid cyclohexyl ester (prepared according to Example 1) are finely dispersed in 100 parts of hot water. 20 parts of polyterephthalic acid glycol ester fibres are dyed for an hour at 95° C. with the said bath. Brilliant blue dyeings of excellent fastness properties are obtained.

In a similar way polyamide and polyurethane fibres and also acetate rayon can be dyed very clear blue shades of excellent fastness with the dyestuff. The dyeings on acetate rayon have especially good fastness to light and waste gas.

*Example 3*

10 parts of 1-amino-4-nitroanthraquinone-2-carboxylic acid chloride and 50 parts of isobutyl alcohol are boiled for 2 hours under reflux. After cooling, the ester formed is filtered off by suction, washed with isopropyl alcohol and methanol and then reduced at 90° to 100° C. with a solution of 14 parts of sodium hyposulfite in 240 parts of water. A powerful current of air is led through the reaction mixture, the blue precipitate which separates is filtered off by suction, washed with water until neutral and recrystallized from dioxane containing water. The dyestuff yields clear blue dyeings of excellent fastness to light and washing on polyterephthalic acid glycol ester, polyamide and acetate rayon fibres. According to analysis, 1.4-diaminoanthraquinone-2-carboxylic acid isobutyl ester is present, having the formula:

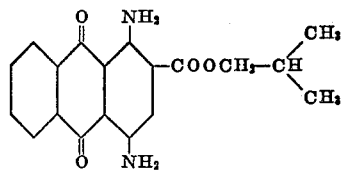

*Example 4*

10 parts of 1-amino-4-nitroanthraquinone-2-carboxylic acid chloride and 100 parts of ethanol are boiled for some hours. The ethyl ester formed is filtered off by suction, after cooling, and washed with alcohol. It can be converted in the way described in Example 1 or 2 into 1.4-diaminoanthraquinone-2-carboxylic acid ethyl ester. The dyestuff is purified by recrystallization from a mixture of dioxane and water. It dyes polyterephthalic acid glycol ester and polyamide fibres brilliant blue shades of good fastness properties. The dyestuff has the formula:

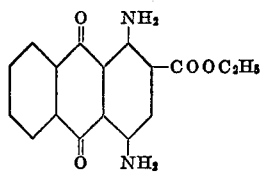

*Example 5*

10 parts of 1-amino-4-bromoanthraquinone-2-carboxylic acid chloride and 70 parts of cyclohexanol are heated at 110° C. for 2 hours. The mixture is then cooled, 1-amino-4-bromoanthraquinone-2-carboxylic acid cyclohexyl ester thereby separating in red-brown crystals. It is filtered off by suction, washed with cyclohexanol and alcohol and dried.

9.5 parts of the ester thus obtained are boiled with 6 parts of para-toluenesulfonamide, 4 parts of potassium acetate, 0.2 part of copper powder, 0.2 part of copper acetate and 45 parts of butanol until the solution has become free from halogen. By adding methanol, violet crystals separate. These are filtered off by suction, washed with butanol and alcohol, dried and then dissolved in 60 parts of 90% sulfuric acid. After stirring for an hour at normal temperature it is poured onto ice and then the sulfuric acid is neutralized by the addition of sodium carbonate. The deposited blue precipitate is filtered off by suction, washed neutral with water and dried. The dyestuff can be purified by recrystallization from dioxane. It is identical with the product obtainable according to Example 1.

*Example 6*

25 parts of 1.4-dichloroanthraquinone-6-carboxylic acid chloride and 150 parts of ethanol are boiled under reflux for 3 hours. After cooling it is filtered by suction, washed with ethanol and dried.

21 parts of the yellow 1.4-dichloroanthraquinone-6-carboxylic acid ethyl ester thus obtained are heated for 6 hours at 170° C. with 33 parts of para-toluenesulfonamide, 24 parts of potassium acetate, 0.5 part of copper acetate and 150 parts of nitrobenzene. The reaction mixture thus becomes colored intense red. It is allowed to cool and is filtered off by suction, washed with nitrobenzene, alcohol and water and dried. The brilliant red crystals of 1.4-bis(para-toluenesulfonamino)-anthraquinone-6-carboxylic acid ethyl ester are dissolved in 250 parts of concentrated sulfuric acid while cooling. It is stirred for 2 hours at 20° C. and then poured into ice water. A brilliant blue-red precipitate thereby separates and is filtered off by suction and washed with water to remove the sulfuric acid. The dyestuff can be purified by recrystallization from dioxane. It has the following formula:

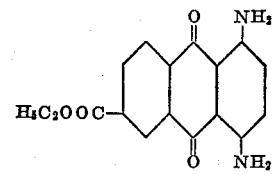

and dyes acetate rayon, polyamide and polyterephthalic acid glycol ester fibres clear violet shades of good fastness from aqueous dispersion.

*Example 7*

By replacing the 1.4-dichloroanthraquinone-6-carboxylic acid in Example 5 by the same amount of 1.4-dichloroanthraquinone-5-carboxylic acid, there is obtained the dyestuff of the following formula:

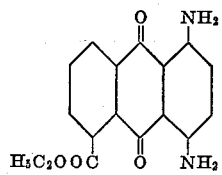

It is a blue-red powder which dyes polyamide, acetate rayon and polyterephthalic acid glycol ester fibres brilliant violet shades of good fastness from aqueous dispersion.

*Example 8*

25 parts of 1-amino-4-bromoanthraquinone-2-carboxylic acid chloride, 30 parts of ortho-dichlorobenzene and 30 parts of ethanol are boiled under reflux for 2 hours. After cooling, the separated red crystals of the ethyl ester are filtered off by suction, washed with alcohol and dried.

23 parts of the 1-amino-4-bromoanthraquinone-2-carboxylic acid ethyl ester thus obtained are heated for 7 hours at 115° C. with 56 parts of aniline, 13.6 parts of potassium acetate and 0.1 part of copper acetate, the original red color of the mixture thereby changing to blue-green. 100 parts of methanol are stirred in, the separated crystals are filtered off by suction, washed with methanol and water and dried. The new dyestuff can be purified by recrystallization from dioxane. It forms greenish-blue needles and has the following formula:

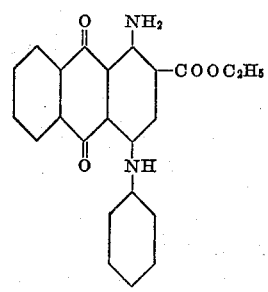

It dissolves in organic solvents with a blue-green color and dyes polyterephthalic acid glycol ester, polyamide and acetate rayon fibres clear greenish-blue shades of good fastness from aqueous dispersion.

*Example 9*

10 parts of 1,4-diaminoanthraquinone-2.3-dicarboxylic acid and 100 parts of methyl sulfuric acid are heated at 140° C. until a sample withdrawn in no longer soluble in dilute sodium carbonate solution. It is then poured into ice-water and the resultant blue-red solution is made carbonate-alkaline while cooling. The precipitated ester is filtered off by suction, washed and dried. It can be purified by recrystallization from dioxane and is a blue crystal powder which dissolves in concentrated sulfuric acid giving an almost colorless solution. Upon the addition of paraformaldehyde, this solution becomes deep blue in color.

The dyestuff has the following formula:

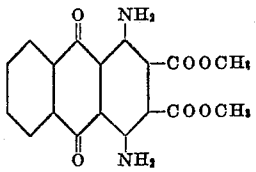

It dyes polyterephthalic acid glycol ester, polyamide and acetate rayon fibres clear blue shades of excellent fastness.

If the methyl sulfuric acid be replaced by the same amount of ethyl sulfuric acid, then by heating at 100° C. 1.4-diaminoanthraquinone-2.3-dicarboxylic acid diethyl ester is obtained which yields also clear blue shades of similar fastness on polyterephthalic acid glycol ester, polyamide and acetate rayon fibres.

*Example 10*

30 parts of 1-amino-4-hydroxyanthraquinone-2-carboxylic acid and 200 parts of methyl sulfuric acid are heated for 30 minutes at 140° C. After cooling, it is poured into ice-water and the deposited blue-red precipitate is filtered off by suction, washed with water until neutral and dried. By recrystallization from dioxane the new dyestuff is obtained in the form of violet needles. It has the formula:

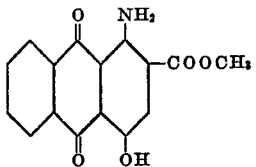

and dyes polyterephthalic acid glycol ester, polyamide and acetate rayon fibres violet shades of good fastness.

What we claim is:

1. A dyestuff of the anthraquinone series having the general formula

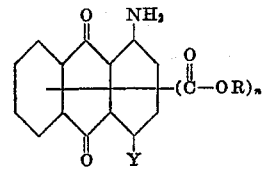

wherein Y is a member of the group consisting of amino, phenylamino, and hydroxyl radicals, R is a member of the group consisting of saturated alkyl and cycloalkyl radicals containing not more than 8 carbon atoms, and $n$ is an integer of 1 to 2.

2. A dyestuff having the formula

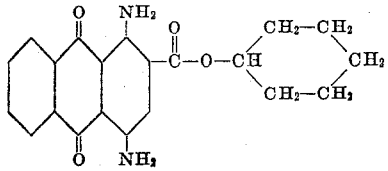

3. A dyestuff having the formula

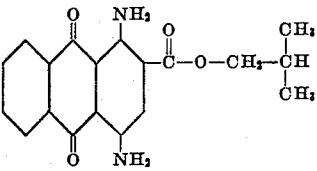

4. A dyestuff having the formula

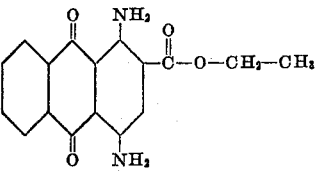

5. A dyestuff having the formula

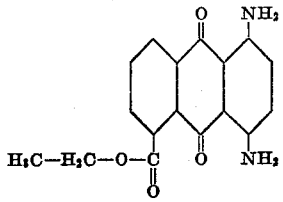

6. A dyestuff of the anthraquinone series having the general formula

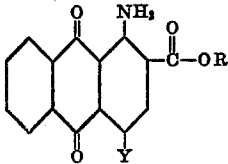

wherein Y is a member of the group consisting of amino, phenylamino, and hydroxy radicals and R is a member of the group consisting of saturated alkyl and cycloalkyl radicals containing not more than 8 carbon atoms.

References Cited in the file of this patent

UNITED STATES PATENTS 1,849,444   Wilke _____ Mar. 15, 1932

FOREIGN PATENTS 661,045   Great Britain _____ Nov. 14, 1951